May 24, 1949.　　　　　J. H. COOPER　　　　　2,471,387
ENGINE PROTECTIVE DEVICE
Filed Sept. 14, 1946　　　　　　　　　　　　　4 Sheets-Sheet 1

Fig. 1.

INVENTOR.
JAMES H. COOPER
BY Weatherford and
Weatherford
attys

INVENTOR.
JAMES H. COOPER

May 24, 1949. J. H. COOPER 2,471,387
ENGINE PROTECTIVE DEVICE
Filed Sept. 14, 1946 4 Sheets-Sheet 4

INVENTOR.
JAMES H. COOPER
BY Weatherford and
Weatherford
attys

Patented May 24, 1949

2,471,387

UNITED STATES PATENT OFFICE 2,471,387

ENGINE PROTECTIVE DEVICE

James H. Cooper, Memphis, Tenn., assignor to Heiskell Weatherford, Jr., Memphis, Tenn.

Application September 14, 1946, Serial No. 697,137

20 Claims. (Cl. 123—198)

This invention relates to means for protecting engines and other machinery from damage due to failure of the lubricating system and particularly relates to means responsive to the pressure of the lubricant in the lubricating system which are effective to automatically cut off such engine or machinery on failure of such pressure.

The present device utilizes the pressure built up and maintained by the usual circulatory pump in the lubricating system of an internal combustion engine in cooperation with the reduction of pressure below normal atmospheric pressure created by the air intake system of the engine establishing a differential of pressures, to effect setting of the parts in what is hereinafter described as running position, and is responsive to failure of the pressure in the lubricating system to effect cut-off of the engine either by blocking the flow of fuel or air or both to the engine or by effecting cut-off in the ignition system.

As is well known, engines and machinery with their multitude of rapidly moving parts must be properly lubricated to prevent serious damage to such parts, and for this purpose are provided with circulatory lubricating systems which include a sump, such as a crank case or reservoir, for the collection and retaining of the lubricant, usually a fluid such as oil, a piping system through which lubricant is delivered to the engine parts requiring lubrication, a circulating pump connected to the sump and delivering the lubricant therefrom under pressure into the piping system, and a return system by which lubricant is returned to the sump. Upon failure of the lubricating system during operation, the probability of serious damage to the moving parts is created and exists so long as the engine continues operation without proper lubrication. It, therefore, follows that in order to obtain maximum protection for the engine or machine and its component parts, the engine or machine should be stopped substantially at the time of a failure in the lubricating system and before the supply of lubricant at points requiring lubrication can be so dissipated or returned to the sump as to endanger the engine parts.

The answer to this problem has been variously sought heretofore, but prior devices have been largely ineffective to satisfactorily accomplish the purpose because of either failing to be fully automatic throughout the various phases of operation or in practically being inoperable to perform the claimed function. Thus, for example, devices have been known for accomplishing engine cutoff, but have made no provision for resetting for further operation and require manual operation for initial starting.

In addition, it is highly desirable to provide a ready manual cut-off, particularly in stationary engines, as a supplement to the automatic cut-off, which will be operable to take advantage of the features of the automatic cut-off including resetting of the device for subsequent operation. Prior devices have failed additionally in lacking or being unable to provide such a supplemental cut-off which can make use of the features of the main cut-off.

The principal object of this invention is to provide a protective system for an engine or machine, which system is automatically operable responsive to failure in the lubricating system of such engine or machine to effect stoppage thereof.

A further object is to provide such a protective system which will automatically be reset for subsequent starting after stoppage has been completed.

A further object is to provide a control for an engine adapted to reduce the speed of the engine in direct proportion to a reduction in the pressure in the lubricating system.

A further object is to provide such a protective system which will not interfere with or hamper the normal operation of the engine with which it is associated.

A further object is to provide a protective system for engines or machines which cooperatively uses the pressure created in the circulatory lubricating system of such engine or machine together with a differential of pressure created by the air intake of such engine or other vacuum means, and which effects cut-off responsive to cut-off of pressure in the lubricating system.

A further object is to provide a protective system for engines with means for manually cutting off lubricating system pressures thereinto and thereby effecting engine stoppage as in emergencies or the like.

A further object is to provide an engine protective system automatically and manually operable for effecting engine stoppage which will automatically return to engine starting position after stoppage has been completed.

A further object is to provide an engine protective system, including a supplemental valve, which is effective to open said valve responsive to increase in lubricating system pressures and to effect closure thereof responsive to decrease in lubricating system pressures.

A further object is to provide an integral casing housing the means of this invention for convenient mounting on an engine or other machine.

A further object is to generally improve the design, efficiency, and utility of such devices.

The means by which the foregoing and other objects of the invention are accomplished and the manner of their accomplishment will be readily understood from the following specification upon reference to the accompanying drawings, in which.

Referring now to the drawings in which the various parts are indicated by numerals:

The device is principally housed in a metallic body 11 formed of an integral casing which is machined and bored to accommodate the parts of the device and is adapted for use with an internal combustion engine 12, to which it may be secured as by a suitable bracket 13 and bolts 14. The engine has a circulatory lubricating system including a pump 15, an oil sump or reservoir 17, and a flow pipe system 19 through which lubricant taken from the reservoir by the pump is carried under pressure to the engine parts requiring lubrication. The engine as shown includes the usual air intake pipe 23, and may be provided with an engine driven vacuum pump 24.

The body casing 11 is terminated at one end in an annular flange 25 and preferably includes along one side a longitudinal bulge 27. On top of the casing is preferably formed an integral transverse portion 29, the purpose of which is hereinafter pointed out. The casing is internally machined to form a longitudinal cylindrical chamber which is adapted to slidably receive a reciprocable piston 31, which divides the chamber into sub-chambers 33, 34, the piston forming a substantially pressure-tight dividing wall, which is slidable within the chamber alternately varying the size of the sub-chambers.

Piston 31 is preferably provided with piston rings 35 to effect a seal against pressure or other leakage from sub-chamber to sub-chamber. It is also preferably formed with a head projection 36 extending into chamber 33. The head projection is preferably counter-bored and has secured therewithin in suitable manner, as by rivet 37, a piston rod 39, movable by the piston and extending through a suitable opening 41 provided in the end wall 43 of the body 11. The opening 41 is provided with a suitable packing seal 45 having a press fit within opening 41 and surrounding piston rod 39, to seal the opening against leakage, while permitting the rod to readily slide therethrough in the manner hereinafter described. Internally, chamber 34 is provided adjacent but spaced from end wall 43 with an annular shoulder 47 adapted to serve as an abutment limiting movement of the piston 31 toward the end wall. Piston 31 is counter-bored to receive a compression spring 49, one end of which bears against the interior of end wall 43 which may be counter-bored to receive the spring. Spring 49 urges the piston 31 away from shoulder 47, toward the left in the drawings.

Adjacent flange 25, the casing is machined to form a chamber 51, which is divided from chamber 33 by an end plug 53 suitably secured in position as by bolts 55. Closure of chamber 33 is effected by the end plug, which preferably has an annular flange adapted to closely fit within the bore of chamber 33 to effect a seal. Centrally the end plug is preferably provided with a substantially cylindrical projection 57, extending into chamber 33, this projection being apertured to slidingly receive a floating rod 59 which is of such length as to extend from chamber 33 through end plug 53 and into chamber 51. The floating rod includes a head 61 adapted to abut the end of projection 57 and thereby limit movement of the floating rod into chamber 51 and is preferably provided at its opposite end with a removable stop member such as a cotter pin 63 to limit movement of the floating rod into chamber 33. End plug 53 is preferably counter-bored as at 54 to provide a seat for the stop member 63.

Secured to the flange 25 of casing 11, as by bolts 65, is an integral annular flange 66 of a head 67 which head is bored to form therein a chamber 69, including a chamber portion of reduced size terminating in a shoulder 70. Head 67 is provided with a substantially cylindrical projection 71 extending from the head end wall 72 into chamber 69, which projection is centrally tapped to provide a threaded aperture 73.

The chambers 51, 69 are segregated by a diaphragm assembly, preferably comprising a flexible diaphragm 75, a pair of washers 77 having oppositely disposed annular flanges 78, and a pair of flat washers 79, held in assembled relation by a rivet 81 having a head on each side of the assembly. The diaphragm 75 is of oil-resistant material and may be of metal such as bronze or of impregnated fabric. The diaphragm assembly is secured and held in position between chambers 51 and 69 by the engagement of the edge thereof between the flange 66 of head 67 and flange 25 of casing 11 by bolts 65.

The flanges 78 are oppositely disposed, one flange extending toward end plug 53 and being adapted to stop movement of the diaphragm assembly theretoward, and the other flange extending toward shoulder 70 of head 67 and being similarly adapted to stop movement of the diaphragm assembly theretoward, to prevent overtravel thereof during operation. Mounted within chamber 69 is a compression spring 83 seated against the inner side of end wall 72, surrounding projection 71 and bearing against a side of the diaphragm assembly, urging the assembly toward end plug 53.

The transverse portion 29 of the casing is longitudinally bored from one end to form therein a cylindrical chamber 85 open at one end and closed at the other by an integral end wall 86, and adapted to receive a hollow sleeve 87 which is adapted to act as a slide valve and which has a sliding fit within chamber 85. Sleeve 87 is provided with an integral head 89 which is centrally apertured to receive and have secured therein a rod 91 by which manual movement of sleeve 87 may be accomplished, the rod being preferably provided with a handle 93 for ease of such movement. The open end of chamber 85 is closed by a packing 95 having a press fit therein and being disposed around rod 91, permitting the rod to slidingly move therethrough while a seal against leakage is maintained. Portion 29 is vertically bored to provide an upper aperture 97 and a lower port 99, the aperture and port being in vertical alinement. The upper aperture 97 is preferably internally threaded to receive a pipe as hereinafter described, and extends from chamber 85 through the upper wall of portion 29. The port 99 extends from chamber 85 into chamber 33. A second lower port 101, spaced from port 99, extends from chamber 85 into chamber 33. Sleeve 87 is normally positioned so as to block communication between chambers 33 and 85 and is held in such position by a compression spring 103 surrounding rod 91 within sleeve 87 and being seated at one end against packing 95 and at the other against the inner side of head 89, urging sleeve 87 toward end wall 86. Sleeve 87 is preferably provided with an integral hollow extension 105 holding the sleeve spaced from end wall 86. Head 89 and extension 105 are preferably apertured as at 107, 108, to provide for free fluid communication within chamber 85. End wall 86 is provided with an aperture 109, preferably threaded to receive a pipe as hereinafter described. Sleeve 87 is machined to provide an annular groove 111 therearound, which, when sleeve 87 is in the normal position shown in Fig. 6, registers with aperture 97 and port 99 and provides for fluid communication between aperture 97 and chamber 33.

Intercommunication between chambers is further provided by channelways bored in the casing, the purposes of which are hereinafter pointed out. Thus communication between chambers 51 and 85 is provided by a channelway 113, bored longitudinally in the casing, and communication between chambers 34 and 51 is provided by an elongated channelway 115 bored longitudinally through bulge portion 27 to chamber 51 and transversely within end wall 43 to enter chamber 34.

In installing the device on the engine to be protected, a pressure pipe 117 is connected at one end into the flow pipe of the lubrication system of the engine to receive lubricant or oil under pressure from pump 15. At its opposite end pipe 117 is threadedly engaged in aperture 97 of the transverse portion 29, to furnish oil under pressure into chamber 33 through aperture 97, groove 111, and port 99. A drain pipe 119 is threadedly engaged with aperture 109 of the end wall 86 of transverse portion 29 and at its opposite end discharges into reservoir 17 of the engine. Through pipe 119 fluid drainage connection to the reservoir from chamber 85 is provided and therethrough from the chambers 51 and 34, communicating therewith through channelways 113, 115, and reversely, communication of atmospheric pressure from the reservoir to chamber 85 and through the channelways to chambers 51 and 34.

An air line 121 is connected at one end into aperture 73 of head 67 and at its opposite end is suitably connected into the air intake pipe 23 or to vacuum pump 24 as preferred, providing air flow communication between chamber 69 and the air intake pipe or vacuum pump. A valve 123, which may be a gate valve or butterfly valve, and which should be supplemental to the fuel and/or air valves of the engine, preferably is mounted in the air intake pipe as on a pivot pin 125, and to this valve the end of the piston rod 39 is coupled in suitable fashion, here shown as by a pin 127 fixed adjacent the end of rod 39, slidably engaging the slot of a slotted arm 129 mounted on the pin 125. The arm and valve are movable responsive to the movement of the piston rod to effect opening and closing of the air intake pipe. It will be understood that the manner of coupling the piston rod to the valve may be varied without departing herefrom. It will also be understood that the piston rod may be coupled to the air control valve, to a similar fuel control valve, or to an electrical switch for effecting cut-off without departing herefrom.

Figures 9, 10:
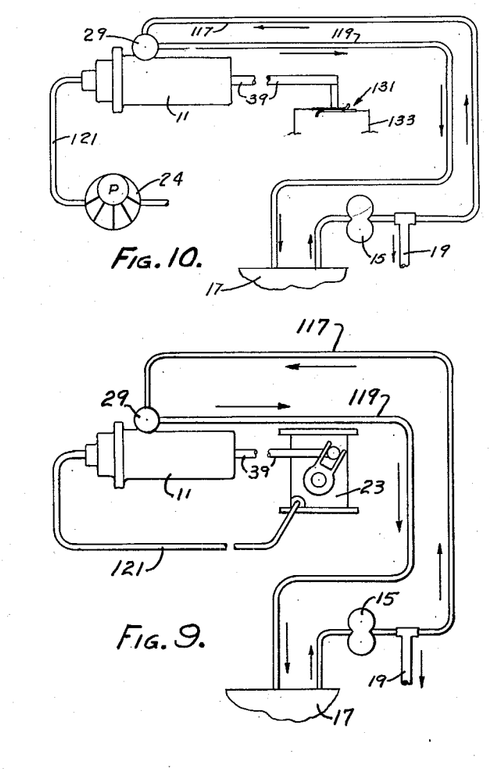
Fig. 9 is a diagrammatic skeletonized view of the device in connection with the other main portions of the lubricating system of the engine.
Fig. 10 is a view, similar to Fig. 9, of a variation of the installation, which includes a vacuum pump, and a connection to an electrical switch.

If the air flow connection from chamber 59 is made to vacuum pump 24, the piston rod may be coupled to an ignition switch 131 of the engine electrical system 133, as shown in Fig. 10, the switch being movable responsive to movement of the piston and rod to effect closing and opening of the circuit. Preferably switch 131 is a sliding switch effective to maintain the electrical circuit throughout the majority of the reciprocating movement of the piston, the circuit being broken only in the last portion of travel of the piston toward cut-off. If the piston rod is coupled to the switch, the supplemental valve 123 may be omitted.

Figure 1:
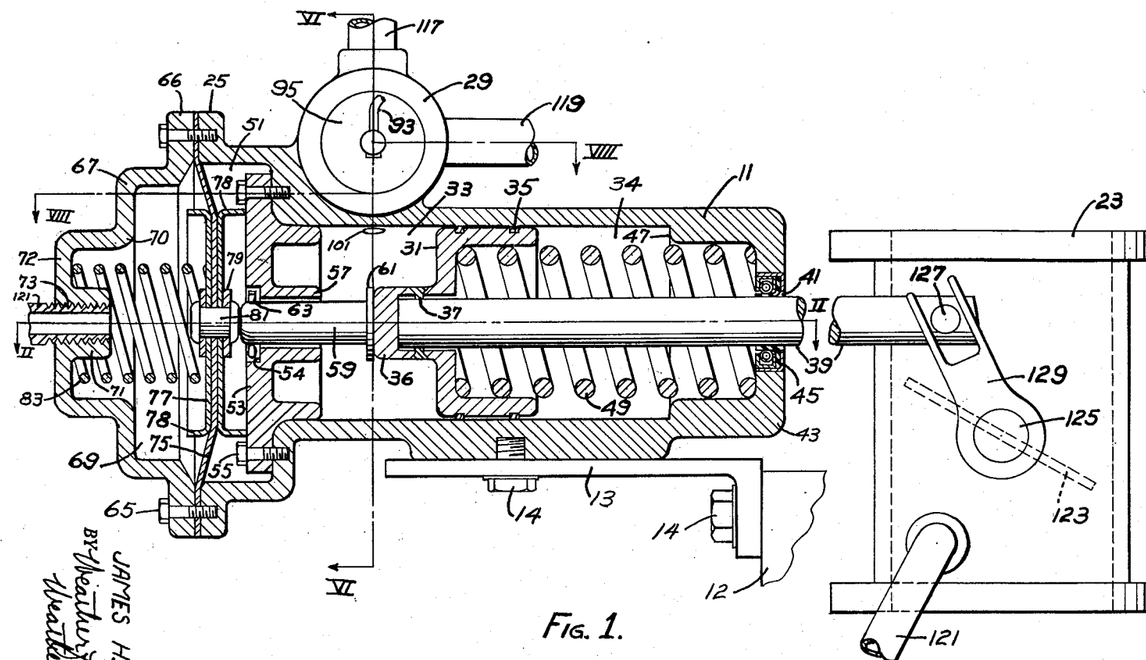
Fig. 1 is a longitudinal side view, partly in section and partly in elevation, of the device of this invention showing the parts of the invention, in engine starting position.
Figures 2, 3, 4, 5:
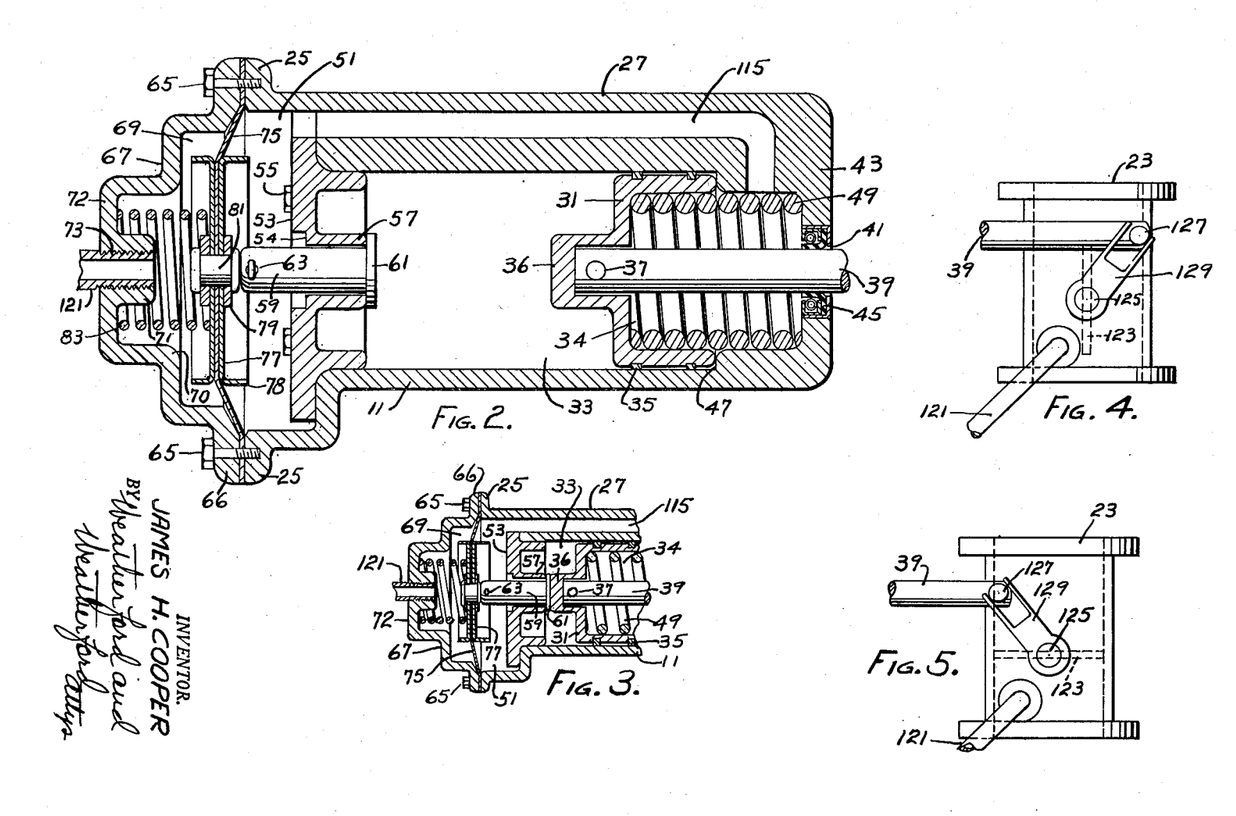
Fig. 2 is a sectional plan view taken on the line II—II of Fig. 1 showing the device in engine running position.
Fig. 3 is a fragmentary view similar to Fig. 2 on a reduced scale showing the relation of various of the parts in engine stoppage position.
Fig. 4 is a side view on a similar reduced scale showing the position of the throttle valve when the device is in engine running position.
Fig. 5 is a view similar to Fig. 4 showing the position of the valve when the device is in engine stoppage position.

For operation, the device is installed and connected. The parts are normally positioned, as shown in Fig. 1, with the valve 123 in partly open position to admit flow of air necessary for engine starting or with switch 131 in electrical contact. The springs 49 and 83 are so dimensioned that when the parts are in the engine starting position of Fig. 1 the springs are in balance, holding the parts in their relative positions. When the engine has been started and begun operation, oil is withdrawn from reservoir 17 by pump 15 and discharged under pressure into line 19 for delivery to parts requiring lubrication and a portion of this flow under pressure branches into pressure pipe 117, by which it is delivered into chamber 33, through annular groove 111 and port 99. As the oil under pressure enters chamber 33, pressure builds up therein, and piston 31 is moved toward end wall 43 against the action of spring 49, the length of movement being relative to the amount of pressure built up in chamber 33. As the piston is moved, the piston rod moves with it and the valve 123 is opened, or if the piston rod is connected to switch 131, the switch parts slidingly maintain contact. When full running pressure has been reached, the piston 31 is seated on shoulder 47, as shown in Fig. 2, and valve 123 is moved to full open position shown in Fig. 4. It will be noted that by the seating of the piston on the shoulder, overtravel of the piston is prevented, and consequently undesired overtravel of the valve past full open position is avoided.

In conjunction with the operation of the device it is desirable to maintain chamber 34 open to atmospheric pressure, to prevent a buildup of pressure therewithin upon compressing movement of piston 31 responsive to oil pressure introduced into chamber 33, and to thereby maintain a desired differential of pressure between chambers 33 and 34 during operation. For this purpose channelway 115 is provided, through which is established communication between chambers 34 and 51 and, through chamber 51 and channelway 113, communication with the atmospheric pressure of the reservoir is established.

The pressure in chamber 33 also moves the floating rod 59 toward the diaphragm assembly 75, 77, 79, 81, bringing the rod into contact with the head of rivet 81, and tending to move the diaphragm toward head 67. Air is withdrawn from chamber 69 through air pipe 121, by the suction created by the air intake pipe 23, or by vacuum pump 24, on pipe 121, thus reducing the pressure in chamber 69 below atmospheric pressure and creating a partial vacuum therein. At the same time chamber 51 is in communication with and receives the atmospheric pressure of reservoir 17 through the channel way 113, chamber 85, and drain pipe 119. The combination of these forces, i. e. the differential in pressures in chambers 51 and 69, and to a minor extent the pressure exerted through floating rod 59, moves the diaphragm 75 toward head 67 against the action of spring 83, moving under full pressure to the position shown in Fig. 2, with spring 83 compressed and rod 59 fully extended into chamber 51, being stopped by the seating of head 61 against projection 57. The diaphragm is held in this position by the differential of pressures in the chambers 51 and 69, so long as the engine continues to operate and a suction is created in air intake 23 or by engine driven vacuum pump 24 and communicated through pipe 121 to chamber 69.

So long as the engine lubricating system continues to function, oil is delivered under pressure into chamber 33, and piston 31 is held thereby moved toward end wall 43, the position varying with variations in the oil pressure in the chamber, and the supplemental valve 123 is held open for the admission of air through the air intake 23 or switch 131 maintained in electrical contact.

If, however, there is a failure in the lubricating system from a loss of supply, a break in the piping, or a breakdown in the pump, resulting in a loss of pressure in the system, the loss of pressure is communicated to chamber 33, and the oil therein will drain therefrom by its route of entrance, that is through port 99, and groove 111 into pipe 117, thence back into the pump or into the main piping of the lubricating system. This drainage is assisted by the piston 31, which under the action of spring 49 moves back into chamber 33, compressing the oil therein and tending to force the oil outward through port 99. With the oil pressure released from chamber 33, piston 31 is moved to the position shown in Fig. 3, in which the head projection 36 is in contact with head 61 of floating rod 59 and the piston rod 39 is correspondingly moved to the position shown in Fig. 5, in which valve 123 has been moved to full cut-off position, stopping flow of combustion air to the engine and consequently effecting cut-off of the engine. If the piston rod is connected to switch 131, electrical contact thereof is broken by movement of the piston to the position of Fig. 3 and of the corresponding movement of the piston rod, cut-off of the engine being effected thereby.

It will be noted that in its preferable formation head projection 36 is of such length that the communication of port 99 into chamber 33 is uninterrupted until full travel of the piston is completed.

Until the moment of full cut-off, the engine continues to operate, although its speed is reduced as the flow of air is reduced by closing valve 123, and the differential in pressures in chambers 51 and 69 is maintained, holding diaphragm 75 against the action of spring 83. When the cut-off or engine stoppage position illustrated in Fig. 3 is reached, piston spring 49 is fully extended, whereas diaphragm spring 83 is compressed, by which reason the tension of spring 83 exceeds that of spring 49.

Upon stoppage of the engine, the suction of the air intake is broken or operation of the vacuum pump is stopped and the pressure in chamber 69 returns to atmospheric pressure, the differential in pressures in chambers 51 and 69 being thereby removed. Diaphragm spring 83 is then able to act on the diaphragm and move it towards end plug 53. Spring 83 in moving the diaphragm also moves floating rod 59, which has been in contact with the diaphragm, into chamber 33 and forces the floating rod against projection 36, moving the piston 31 against the action of spring 49, the diaphragm spring 83 being enabled to overcome spring 49 by reason of the difference in tension above mentioned. As the piston is moved the piston rod is moved, and opening of the valve 123 coupled thereto is begun, or the members of switch 131 are moved into electrical contact. This movement continues until the springs 49, 83 reach the point where their tensions are in balance, which is the position illustrated in Fig. 1, and which, as heretofore described, is the normal or engine starting position in which valve 123 is partially open to admit air for starting combustion. In this manner the device is automatically reset for restarting of the engine after the stoppage thereof has occurred.

It will thus be seen that, by the present invention, an engine may be positively and effectively protected against damage from a failure of lubrication through the automatic engine cut-off which responds to the failure of lubricating pressure before the lubricant at points requiring lubrication has been exhausted and before damage to the parts has occurred. In addition, after cut-off has been effected by the device, it automatically resets itself so that the engine may be again started when the lubricating system has been set in order, or as otherwise desired, eliminating the necessity of manually resetting the device or otherwise preparing the engine for normal starting.

Figure 7:
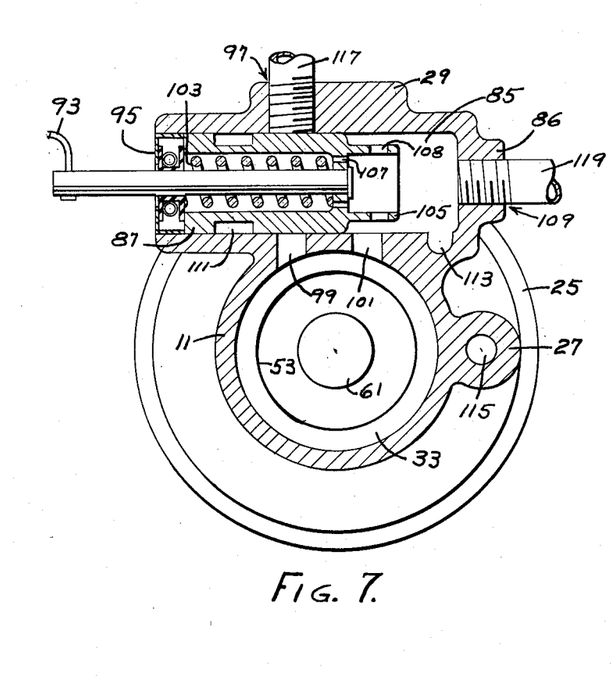
Fig. 7 is a view similar to Fig. 6 showing the manual control means operated to manually effect engine stoppage.
Figure 8:
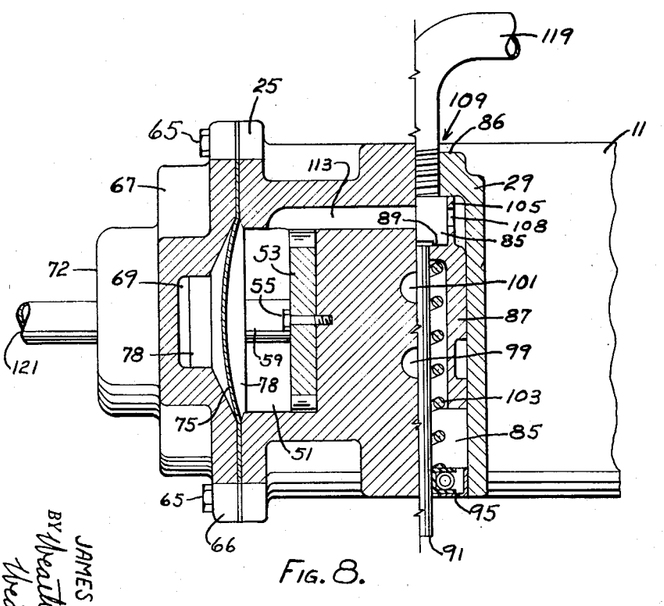
Fig. 8 is a sectional plan view on the line VIII—VIII of Fig. 1, with the parts in engine running position of Fig. 2.

In addition, it is in many instances, especially under emergency conditions, highly desirable to manually cut off an engine, and particularly in stationary engines, the conventional cut-offs are often inconveniently and inaccessibly placed. For the purpose of providing a ready manual cut-off, the present device includes the slidable sleeve 87 within chamber 85. This sleeve may be manually moved, as through handle 93 and rod 91, to the position shown in Fig. 7, sliding of the sleeve compressing spring 103 therewithin. When the sleeve has been so moved, the groove 111 is moved out of register with aperture 97 and port 99, and pressure flow from pipe 117 through the aperture and port into chamber 33 thereby is interrupted. Closure of port 101, normally effected by sleeve 87, is removed by the movement of the sleeve, communication between chambers 33 and 85 being thereby established. Pressure flow into chamber 33 having been interrupted, piston 31, under the action of its spring, moves to the position shown in Fig. 3 to effect closure of valve 123 or opening of switch 131 in the manner heretofore described in conjunction with the automatic cut-off features, thereby effecting engine stoppage. During this movement the oil in chamber 33 discharges therefrom into chamber 85 through port 101 from which it passes through drain line 119 to the reservoir 17.

Figure 6:
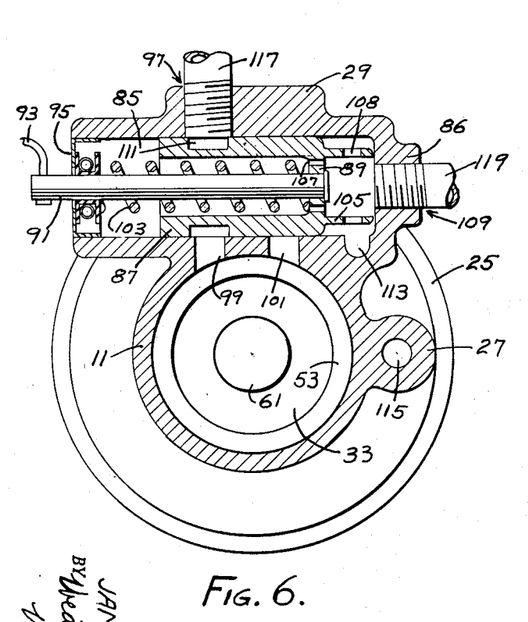
Fig. 6 is a transverse sectional elevation on the line VI—VI of Fig. 1, showing the normal position of the manual control means of this invention.

When engine stoppage has been manually effected through movement of the slide valve or sleeve 87, the handle and rod thereof may be released and the sleeve returned by spring 103 to the position shown in Fig. 6, re-registry of groove 111 with aperture 97 and port 99 being thereby established and closure of port 101 effected. Automatic resetting of the device for subsequent engine starting is effected in the same manner as heretofore described.

Minor seepage of oil from chamber 33 past piston 31 and rings 35 into chamber 34 may occur during operation. Such seepage is enabled to drain from chamber 34 through channelway 115 into chamber 51. Chamber 51 may also receive minor seepage from chamber 33 past the floating rod 59. These seepages received by the chamber 51 are drained therefrom through channelway 113 into chamber 85 whence they pass via drain pipe 119 to the reservoir 17.

It will be understood that while it is preferable to include the manual cut-off sub-assembly, including the sliding sleeve 87 with its annular groove 111, it may be omitted without departing herefrom, in which case pressure line 117 would be brought into direct communication with port 99 for the introduction of pressure flow into chamber 33, and channelway 113 would be brought into direct communication with drain pipe 119 for access of atmospheric pressure to chambers 51 and 34 and for drainage of seepage. Port 101 would then be unnecessary and, therefore, eliminated.

It will further be understood that gate valve 123 may be installed to effect supplemental control of fuel flow to the engine rather than air flow thereto without departing herefrom.

It will be further understood that while this protective device has been described in connection with an internal combustion engine, it may be employed with any machinery which utilizes a pressure circulation system for lubrication. In such use, the pressure line 117 would be connected to the lubricating system and return line 119 connected to the sump or reservoir in manner similar to that heretofore described in conjunction with internal combustion engines. If the motive unit of the machine includes vacuum means, connection thereinto by line 121 may be effected. Otherwise vacuum means would be preferably supplied by vacuum pump 24, connected through air line 121 to chamber 69. Piston rod 39 may then be connected to an electrical switch, as switch 131, in order to effect cut-off in the manner heretofore described. The vacuum pump would, preferably, be operated by the driving unit of the machine, such as an electric motor or the like. It will be seen that operation of the protective device in such a combination would be identical with the operation heretofore described, and that cut-off would be effected responsive to loss of pressure in the chamber housing the piston and resetting effected responsive to cut-off of air flow drawn by the vacuum pump.

I claim:

1. In combination with an internal combustion engine having a lubricating system for supplying oil under pressure during operation, and an air intake pipe for drawing a flow of air into said engine for combustion; a protective device for said engine which includes a valve in said intake pipe adapted in closed position to cut off said air flow and thereby effect interruption of engine operation; a cylindrical chamber in fluid communication with said lubricating system to receive oil under pressure therefrom, a reciprocable piston in said chamber coupled to said valve, whereby said valve is moved toward open and closed positions respectively responsive to movement of said piston, and spring means in said chamber urging said piston to move said valve to closed position; means opposing closing movement of said piston when said engine is inoperative, comprising a diaphragm, second spring means associated with one side thereof, and a floating rod associated with the other side thereof and projecting into said chamber, said second spring urging said diaphragm and said floating rod toward said piston, to bring said floating rod into opposing contact with said piston, to hold said valve partially open, the spring side of said diaphragm being enclosed in a chamber which is in air flow communication with said air intake pipe, whereby air is withdrawn from said diaphragm chamber into said air intake pipe during engine operation, to reduce the pressure in said chamber below atmospheric pressure, the rod side of said diaphragm being open to atmospheric pressure whereby a differential of pressures on the opposite sides of said diaphragm is created, said diaphragm being moved by said pressure differential in opposition to its related said spring away from piston opposing position; said piston being moved against its related said spring to open said valve responsive to introduction of oil under pressure into said piston chamber, said piston spring moving said piston to effect closure of said valve upon loss of said oil pressure in said piston chamber, whereby interruption of engine operation is effected and said air flow is cut off; cut-off of said air flow equalizing the pressures on the opposite sides of said diaphragm and releasing said diaphragm spring to return said diaphragm and floating rod to piston opposing position, moving said piston to partially open said valve for subsequent engine operation.

2. In combination with an internal combustion engine having a lubricating system for supplying oil under pressure during operation and an air intake pipe for drawing a flow of air into said engine for combustion; a protective device for said engine which includes valve means adapted in closed position to effect interruption of engine operation; a cylindrical chamber in fluid communication with said lubricating system to receive oil under pressure therefrom, a reciprocable piston in said chamber coupled to said valve means, whereby said valve is moved toward open and closed positions respectively responsive to movement of said piston, and spring means in said chamber urging said piston to move said valve to closed position; means opposing closing movement of said piston when said engine is inoperative, comprising a diaphragm, second spring means associated with one side thereof, and a floating rod associated with the other side thereof and projecting into said chamber, said second spring urging said diaphragm and said floating rod toward said piston, to bring said floating rod into opposing contact with said piston to hold said valve partially open, the spring side of said diaphragm being enclosed in a chamber which is in air flow communication with said air intake pipe during engine operation to reduce the pressure in said diaphragm chamber below atmospheric pressure, the rod side of said diaphragm being open to atmospheric pressure, whereby a differential of pressures on the opposite sides of said diaphragm is created, said diaphragm being moved by said pressure differential in opposition to its related said spring, away from piston opposing position; said piston being moved against its related said spring to open said valve responsive to introduction of oil under pressure into said piston chamber, said piston spring moving said piston to effect closure of said valve upon loss of said oil pressure in said pison chamber, whereby interruption of engine operation is effected and said air flow is cut-off; cut-off of said air flow equalizing the pressures on the opposite sides of said diaphragm and releasing said diaphragm spring to return said diaphragm and floating rod to piston opposing position, moving said piston to partially open said valve for subsequent engine operation.

3. A device in accordance with claim 2, which includes means manually operable to interrupt said fluid communication and effect loss of oil pressure in said piston chamber.

4. A device in accordance with claim 2, which includes means manually operable to interrupt said fluid communication and effect loss of oil pressure in said piston chamber, and means operable on release of said manual means to reestablish said fluid communication.

5. A device in accordance with claim 2, which includes a slide valve manually operable to interrupt said fluid communication and effect loss of oil pressure in said piston chamber, and spring means urging return of said slide valve to effect reestablishment of said fluid communication, said latter spring means being effective on release of said slide valve to accomplish said reestablishment.

6. In combination with an internal combustion engine having a lubricating system for supplying oil under pressure during operation and an air intake pipe for drawing a flow of air into said engine for combustion; a protective device for said engine which includes valve means adapted in closed position to effect interruption of engine operation; a cylindrical chamber in fluid communication with said lubricating system to receive oil under pressure therefrom, a reciprocable piston in said chamber coupled to said valve means, whereby said valve is moved toward open and closed positions respectively responsive to movement of said piston, and spring means in said chamber urging said piston to move said valve to closed position; means opposing closing movement of said piston when said engine is inoperative, including second spring means urging said movement opposing means into opposition to said piston to hold said valve partially open, one side of said movement opposing means being in air flow communication with said air intake pipe whereby air is withdrawn therefrom into said air intake pipe during engine operation to reduce the pressure on said side below atmospheric pressure, the opposite side of said movement opposing means being open to atmospheric pressure, whereby a differential of pressures on the opposite sides of said latter means is created, by which said latter means are moved in opposition to said second spring away from piston opposing position, said piston being moved against its related said spring to open said valve responsive to introduction of oil under pressure into said piston chamber, said piston spring moving said piston to effect closure of said valve upon loss of said oil pressure in said piston chamber, whereby interruption of engine operation is effected, and said air flow cut off; cut-off of said air flow equalizing the pressures on the opposite sides of said movement opposing means and releasing said second spring to return said movement opposing means to piston opposing position, moving said piston to partially open said valve for subsequent engine operation.

7. In combination with an internal combustion engine having a lubricating system for supplying oil under pressure during operation, a protective device for said engine which includes means movable to effect interruption of engine operation; a cylindrical chamber in fluid communication with said lubricating system to receive oil under pressure therefrom, a reciprocable piston in said chamber coupled to said means, whereby said means are moved toward engine operating and operation interrupting positions respectively responsive to movement of said piston, and spring means urging said piston to move said first means to operation interrupting position; means opposing movement of said piston toward said operation interrupting position when said engine is inoperative, including second spring means urging said movement opposing means into opposition to said piston to limit movement thereof toward said operation interrupting position; vacuum means associated with said engine and effective during operation thereof, one side of said movement opposing means being in air flow communication with said vacuum means whereby air is withdrawn therefrom during engine operation to reduce the pressure on said side below atmospheric pressure, the opposite side of said movement opposing means being open to atmospheric pressure, whereby a differential of pressures on the opposite sides of said latter means is created by which said latter means are moved in opposition to said second spring means away from piston opposing position; said piston being moved against its related said spring to establish said engine operating position responsive to introduction of oil under pressure into said piston chamber, said piston spring moving said piston to effect said operation interrupting position upon loss of said oil pressure in said piston chamber, said air flow being cut off thereby; cut-off of said air flow equalizing the pressures on the opposite sides of said movement opposing means and releasing said second spring to return said latter means to piston opposing position, moving said piston toward engine operating position.

8. A device in accordance with claim 7, which includes means manually operable to interrupt said fluid communication and effect loss of oil pressure in said piston chamber.

9. A device in accordance with claim 7, which includes means manually operable to interrupt said fluid communication and effect loss of oil pressure in said piston chamber, and means operable on release of said manual means to reestablish said fluid communication.

10. A device in accordance with claim 7, which includes a slide valve manually operable to interrupt said fluid communication and effect loss of oil pressure in said piston chamber, and spring means urging return of said slide valve to effect reestablishment of said fluid communication, said latter spring means being effective on release of said slide valve to accomplish said reestablishment.

11. A protective device for an internal combustion engine lubricated by oil supplied under pressure, comprising fluid pressure responsive means communicated with the pressure of said oil, means actuated by said pressure-responsive means to effect cut-off of said engine responsive to loss of pressure in said oil, means for resetting said cut-off means for subsequent starting of said engine, and means restraining resetting movement of said resetting means during operation of said engine, cut off of said engine removing said restraint to release said resetting means and effect said resetting.

12. A protective device for an internal combustion engine lubricated by oil supplied under pressure, comprising fluid pressure responsive means in communication with the pressure of said oil, means resisting response of said first means to said pressure and urging movement of said first means against said pressure, means actuated by movement of said pressure-responsive means under said urging to effect cut-off of said engine responsive to loss of pressure in said oil, means manually operable to interrupt said pressure communication and effect loss of pressure on said pressure responsive means, means for resetting said cut-off means for subsequent starting of said engine, and means restraining said resetting means during operation of said engine, cut off of said engine removing said restraint to release said resetting means and effect said resetting.

13. A protective device for an internal combustion engine lubricated by oil supplied under pressure, comprising fluid pressure responsive means in communication with the pressure of said oil, spring means resisting response of said first means to said pressure and urging movement of said first means against said pressure, means actuated by movement of said pressure-responsive means under said urging to effect cut-off of said engine responsive to loss of pressure in said oil, means manually operable to interrupt said pressure communication and effect loss of pressure on said pressure responsive means, means operable on release of said manual means to reestablish said communication, means for resetting said cut-off means for subsequent starting of said engine, and means restraining said resetting means during operation of said engine, cut off of said engine removing said restraint to release said resetting means and effect said resetting.

14. A protective device for an internal combustion engine lubricated by oil supplied under pressure, comprising fluid pressure responsive means communicated with the pressure of said oil, means actuated by said pressure-responsive means to effect cut-off of said engine responsive to loss of pressure in said oil, and means for resetting said cut-off means for subsequent starting of said engine, in which said resetting means include vacuum means communicated with one side of said resetting means to reduce the pressure thereon below atmospheric pressure during engine operation, the opposite side of said resetting means being open to atmospheric pressure, whereby a differential of pressure on the opposite sides of said resetting means is created by which said resetting means are restrained during engine operation, cut-off of said engine equalizing said pressures and releasing said resetting means to effect said resetting.

15. A protective device for an internal combustion engine lubricated by oil supplied under pressure, comprising fluid pressure responsive means communicated with the pressure of said oil, means actuated by said pressure-responsive means to effect cut-off of said engine responsive to loss of pressure in said oil, and means for resetting said cut-off means for subsequent starting of said engine, in which said resetting means include a diaphragm, a spring associated therewith urging said diaphragm toward resetting of said cut-off means, and vacuum means communicated with one side of said diaphragm to reduce the pressure thereon below atmospheric pressure during engine operation, the opposite side of said diaphragm being open to atmospheric pressure, whereby a differential of pressure on the opposite sides of said diaphragm is created by which said spring is restrained during engine operation, cut-off of said engine equalizing said pressures and releasing said spring to effect said resetting.

16. A protective device for an internal combustion engine lubricated by oil supplied under pressure and having an air intake pipe for drawing a flow of air into said engine for combustion, comprising fluid pressure responsive means communicated with the pressure of said oil, means actuated by said pressure-responsive means to effect cut-off of said engine responsive to loss of pressure in said oil, and means for resetting said cut-off means for subsequent starting of said engine, in which said resetting means include a diaphragm, a spring associated therewith urging said diaphragm toward resetting of said cut-off means, said air intake pipe being communicated with one side of said diaphragm to reduce the pressure thereon below atmospheric pressure during engine operation, the opposite side of said diaphragm being open to atmospheric pressure, whereby a differential of pressure on the opposite sides of said diaphragm is created by which said spring is restrained during engine operation, cut-off of said engine equalizing said pressures and releasing said spring to effect said resetting.

17. A protective device for a machine lubricated by fluid supplied under pressure and having driving means, which comprises fluid pressure responsive means communicated with the pressure of said fluid, means actuated by said pressure responsive means to effect cut-off of said driving means responsive to loss of pressure in said fluid, and means released by cut-off of said driving means to effect resetting of said cut-off means for subsequent starting of said driving means, in which said resetting means include vacuum means operated by said driving means and communicated with one side of said resetting means to reduce the pressure thereon below atmospheric pressure during operation of said driving means, the opposite side of said resetting means being open to atmospheric pressure whereby a differential of pressure on the opposite sides of said resetting means is created by which said resetting means are restrained during operation of said driving means, cut-off of said driving means effecting cut-off of said vacuum means to equalize said pressures and release said resetting means to effect said resetting.

18. A protective device for a machine lubricated by fluid supplied under pressure and having driving means, which comprises fluid pressure responsive means communicated with the pressure of said fluid, means resisting response of said first means to said pressure and urging movement of said first means against said pressure, means actuated by movement of said pressure responsive means under said urging to effect cut-off of said driving means responsive to loss of pressure in said fluid, means for resetting said cut-off means for subsequent starting of said driving means, and means restraining said resetting means during operation of said driving means, cut off of said driving means removing said restraint to release said resetting means and effect said resetting.

19. A protective device for a machine lubricated by fluid supplied under pressure and having driving means, which comprises fluid pressure responsive means communicated with the pressure of said fluid, means actuated by said pressure responsive means to effect cut-off of said driving means responsive to loss of pressure in said fluid, and means released by cut-off of said driving means to effect resetting of said cut-off means for subsequent starting of said driving means, in which said resetting means include a diaphragm, a spring associated therewith urging said diaphragm toward resetting of said cut-off means, and vacuum means operated by said driving means and communicated with one side of said diaphragm to reduce the pressure thereon below atmospheric pressure during operation of said driving means, the opposite side of said diaphragm being open to atmospheric pressure whereby a differential of pressure on the opposite sides of said diaphragm is created by which said spring is restrained during operation of said driving means, cut-off of said driving means effecting cut-off of said vacuum means to equalize said pressures and release said spring to effect said resetting.

20. A protective device for a machine lubricated by fluid supplied under pressure and having driving means, which comprises fluid pressure responsive means communicated with the pressure of said fluid, spring means resisting response of said first means to said pressure and urging movement of said first means against said pressure, means actuated by movement of said pressure responsive means under said urging to effect cut off of said driving means responsive to loss of pressure in said fluid, means for resetting said cut off means for subsequent starting of said driving means, means urging said resetting means toward resetting, and means restraining said urging means during operation of said driving means, cut off of said driving means releasing said restraining means.

JAMES H. COOPER.

REFERENCES CITED

The following references are of record in the file of this patent:

UNITED STATES PATENTS

| Number | Name | Date |
|---|---|---|
| 2,356,679 | Mallory | Aug. 22, 1944 |
| 2,373,735 | Alexander | Apr. 17, 1945 |